US008072918B2

(12) United States Patent
Muharemovic et al.

(10) Patent No.: US 8,072,918 B2
(45) Date of Patent: Dec. 6, 2011

(54) NETWORK-BASED INTER-CELL POWER CONTROL FOR MULTI-CHANNEL WIRELESS NETWORKS

(75) Inventors: Tarik Muharemovic, Dallas, TX (US); Zukang Shen, Richardson, TX (US); Pierre Bertrand, Antibes (FR)

(73) Assignee: Texas Instruments Incorporated, Dallas, TX (US)

( * ) Notice: Subject to any disclaimer, the term of this patent is extended or adjusted under 35 U.S.C. 154(b) by 860 days.

(21) Appl. No.: 12/062,343

(22) Filed: Apr. 3, 2008

(65) Prior Publication Data
US 2008/0247375 A1   Oct. 9, 2008

Related U.S. Application Data

(60) Provisional application No. 60/909,900, filed on Apr. 3, 2007.

(51) Int. Cl.
*H04B 7/204* (2006.01)
*H04B 7/00* (2006.01)
*H04W 4/00* (2009.01)
*H04J 1/00* (2006.01)

(52) U.S. Cl. ........ 370/319; 370/329; 370/341; 370/343; 455/522

(58) Field of Classification Search .......... 370/310–350; 455/1–525; 375/144, 148, 221, 260, 267, 375/299, 346–348, 358
See application file for complete search history.

(56) References Cited

U.S. PATENT DOCUMENTS

| 7,573,850 | B2* | 8/2009 | Li et al. ................ 370/329 |
| 7,668,564 | B2* | 2/2010 | Onggosanusi et al. ....... 455/522 |
| 7,986,959 | B2* | 7/2011 | Malladi et al. ............... 455/522 |
| 2008/0102822 | A1* | 5/2008 | Feng et al. .................... 455/425 |
| 2008/0159323 | A1* | 7/2008 | Rinne et al. .................. 370/431 |
| 2008/0214121 | A1* | 9/2008 | Sutivong et al. ........... 455/67.13 |
| 2008/0233967 | A1* | 9/2008 | Montojo et al. ........... 455/452.2 |

OTHER PUBLICATIONS

3GPP, 3rd Generation Partnership Project; Technical Specification Group Radio Access Network; Evolved Universal Terrestrial Radio Access (E-UTRA), Physical Channels and Modulation, TS 36.211, Release 8, V8.2.0, Mar. 2008, pp. 1-67.

* cited by examiner

*Primary Examiner* — Tri H Phan
(74) *Attorney, Agent, or Firm* — Robert D. Marshall, Jr.; W. James Brady; Frederick J. Telecky, Jr.

(57) ABSTRACT

A method is described for operating a cellular network, where the cellular network uses a plurality of frequency division multiplexing (FDM) bands for wireless communication from user equipment (UE) to a base station (NodeB). At least one band-specific cell parameter is computed for at least one the plurality of FDM bands by a serving NodeB. The band-specific cell parameters are transmitted from the NodeB serving a first cell to a NodeB serving a second cell. The band-specific cell parameters may be computed in response to scheduling information and/or channel specific measurements made by the NodeB. A UE receives a first Power Configuration, a Second Power Configuration, and a Scheduling Message indicative of an FDM band from the set comprising at least from First FDM band and Second FDM band. The UE transmits with the First Power Configuration if the Scheduling Message was indicative of First FDM band, and with the Second Power Configuration otherwise.

18 Claims, 6 Drawing Sheets

NETWORK-BASED INTER-CELL POWER CONTROL FOR MULTI-CHANNEL WIRELESS NETWORKS

CLAIM OF PRIORITY UNDER 35 U.S.C. 119(e)

The present Application for Patent claims priority to U.S. Provisional Application No. 60/909,900 entitled "Network-Based Inter-Cell Power Control For Multi-Channel Wireless Networks" filed Apr. 3, 2007, incorporated by reference herein.

FIELD OF THE INVENTION

This invention generally relates to cellular communication systems, and in particular to wireless frequency division multiplexed operation.

BACKGROUND OF THE INVENTION

Wireless cellular communication networks incorporate a number of mobile UEs and a number of NodeBs. A NodeB is generally a fixed station, and may also be called a base transceiver system (BTS), an access point (AP), a base station (BS), or some other equivalent terminology. As improvements of networks are made, the NodeB functionality evolves, so a NodeB is sometimes also referred to as an evolved NodeB (eNB). In general, NodeB hardware, when deployed, is fixed and stationary, while the UE hardware is portable.

In contrast to NodeB, the mobile UE can comprise portable hardware. User equipment (UE), also commonly referred to as terminal or mobile station, may be fixed or mobile device and may be a wireless device, a cellular phone, a personal digital assistant (PDA), a wireless modem card, and so on. Uplink communication (UL) refers to a communication between the mobile UE and the NodeB, whereas downlink (DL) refers to communication from the NodeB to the mobile UE. Each NodeB contains radio frequency transmitter(s) and the receiver(s) used to communicate directly with the mobiles, which move freely around it. Similarly, each mobile UE contains radio frequency transmitter(s) and the receiver(s) used to communicate directly with the NodeB. In cellular networks, the mobiles cannot communicate directly with each other but have to communicate with the NodeB. Embodiments of the invention, however, can be applied even beyond such cellular networks, since only concepts of wireless transmission and reception are needed. Nevertheless, the present invention will be described in the context of a cellular network.

Orthogonal Frequency Division Multiple Access (OFDMA) is a multi-user version of the popular Orthogonal Frequency-Division Multiplexing (OFDM) digital modulation scheme. Multiple access is achieved in OFDMA by assigning subsets of subcarriers to individual users. This allows simultaneous transmission from several users. Based on feedback information about the channel conditions, adaptive user-to-subcarrier assignment can be achieved. If the assignment is done sufficiently fast, this further improves the OFDM robustness to fast fading and narrow-band co-channel interference, and makes it possible to achieve even better system spectral efficiency. Different number of sub-carriers can be assigned to different users, in view to support differentiated Quality of Service (QoS), i.e. to control the data rate and error probability individually for each user. OFDMA is used in the mobility mode of IEEE 802.16 WirelessMAN Air Interface standard, commonly referred to as WiMAX. OFDMA is currently a working assumption in 3GPP Long Term Evolution downlink, named High Speed OFDM Packet Access (HSOPA). Also, OFDMA is the candidate access method for the IEEE 802.22 "Wireless Regional Area Networks".

NodeB is a term used in UMTS to denote the BTS (base transceiver station). In contrast with GSM base stations, NodeB uses WCDMA or OFDMA as air transport technology, depending on the type of network. As in all cellular systems, such as UMTS and GSM, NodeB contains radio frequency transmitter(s) and the receiver(s) used to communicate directly with the mobiles, which move freely around it. In this type of cellular networks the mobiles cannot communicate directly with each other but have to communicate with the BTSs A NodeB can serve several cells, also called sectors, depending on the configuration and type of antenna. Possible configurations include omni cell (360°), 3 sectors (3×120°) or 6 sectors (3 sectors 120° wide overlapping with 3 sectors of different frequency).

The signals from different users within the same cell interfere with one another. This type of interference is known as the intra-cell interference. In addition, the base station also receives the interference from the users transmitting in neighboring cells. This is known as the inter-cell interference Control information bits are transmitted, for example (in PUCCH), in the uplink (UL), for several purposes. For instance, Downlink Hybrid Automatic Repeat ReQuest (HARQ) requires at least one bit of ACK/NACK transmitted information in the uplink, indicating successful or failed circular redundancy check(s) (CRC). Furthermore, an indicator of downlink channel (CQI) needs to be transmitted in the uplink to support mobile UE scheduling in the downlink. While CQI may be transmitted based on a periodic or triggered mechanism, the ACK/NACK needs to be transmitted in a timely manner to support the HARQ operation. Note that ACK/NACK is sometimes denoted as ACKNAK or just simply ACK, or any other equivalent term. This uplink control information is typically transmitted using the physical uplink control channel (PUCCH), as defined by the 3GPP working groups (WG), for evolved universal terrestrial radio access (EUTRA). The EUTRA is sometimes also referred to as 3GPP long-term evolution (3GPP LTE). For said reasons, structure of the PUCCH provides for sufficiently high transmission reliability.

In addition to PUCCH, the EUTRA standard also defines a physical uplink shared channel (PUSCH), intended for transmission of uplink user data. The Physical Uplink Shared Channel (PUSCH) can be dynamically scheduled. This means that time-frequency resources of PUSCH are re-allocated every sub-frame. This (re)allocation is communicated to the mobile UE using the Physical Downlink Control Channel (PDCCH). Alternatively, resources of the PUSCH can be allocated semi-statically, via the mechanism of persistent scheduling. Thus, any given time-frequency PUSCH resource can possibly be used by any mobile UE, depending on the scheduler allocation. Physical Uplink Control Channel (PUCCH) is different than the PUSCH, and the PUCCH is used for transmission of uplink control information (UCI). Frequency resources which are allocated for PUCCH are found at the two extreme edges of the uplink frequency spectrum. In contrast, frequency resources which are used for PUSCH are in between. Since PUSCH is designed for transmission of user data, re-transmissions are possible, and PUSCH is expected to be generally scheduled with less stand-alone sub-frame reliability than PUCCH.

BRIEF DESCRIPTION OF THE DRAWINGS

Particular embodiments in accordance with the invention will now be described, by way of example only, and with reference to the accompanying drawings.

DETAILED DESCRIPTION OF EMBODIMENTS OF THE INVENTION

Conventional cell control mechanisms do not employ frequency division multiplexing (FDM) band-specific direct information exchange between NodeBs serving different cellular sites. Thus, conventional cell control mechanisms are unable to optimally control and deal with frequency-selective interference which individual UE generates to neighboring cell sites. This feature becomes especially important for any kind of frequency division multiplexing (FDM) access strategies. In contrast, embodiments of the cell control method described herein allow an effective control of inter-cell interference by employing frequency division multiplexing (FDM) band-specific information exchange between NodeBs serving different cellular sites. Consequently, in some embodiments of the invention, UEs which transmit on a specific frequency band can transmit with different power configurations, when compared to UEs which use a different frequency band. In other embodiments, band-specific scheduling information is exchanged between NodeBs which control different cells. Scheduling information pertains for future transmissions. Consequently, a NodeB can receive an advanced warning before an FDM band-specific interference occurs. Thus, the NodeB can either re-adjust its own scheduling decision to avoid interference, or alternatively, it can adapt the transmit power and/or modulation and/or coding of scheduled serving UEs, to minimize the impact of impending interference. Thus, the present cell control method can achieve much better overall system spectral efficiency than the conventional control method. In some embodiments, a level of interference generated at some specific FDM bands is monitored by the neighboring cell sites (e.g. non-serving NodeBs), upon which a frequency specific indicator is communicated to the serving cell (i.e. serving NodeB, specifically) of the UE. In other embodiments, predictive scheduling of frequency bands can be performed so that UE near an edge of one cell are scheduled to use different frequency bands from nearby UE in a neighboring cell.

Figure 1:
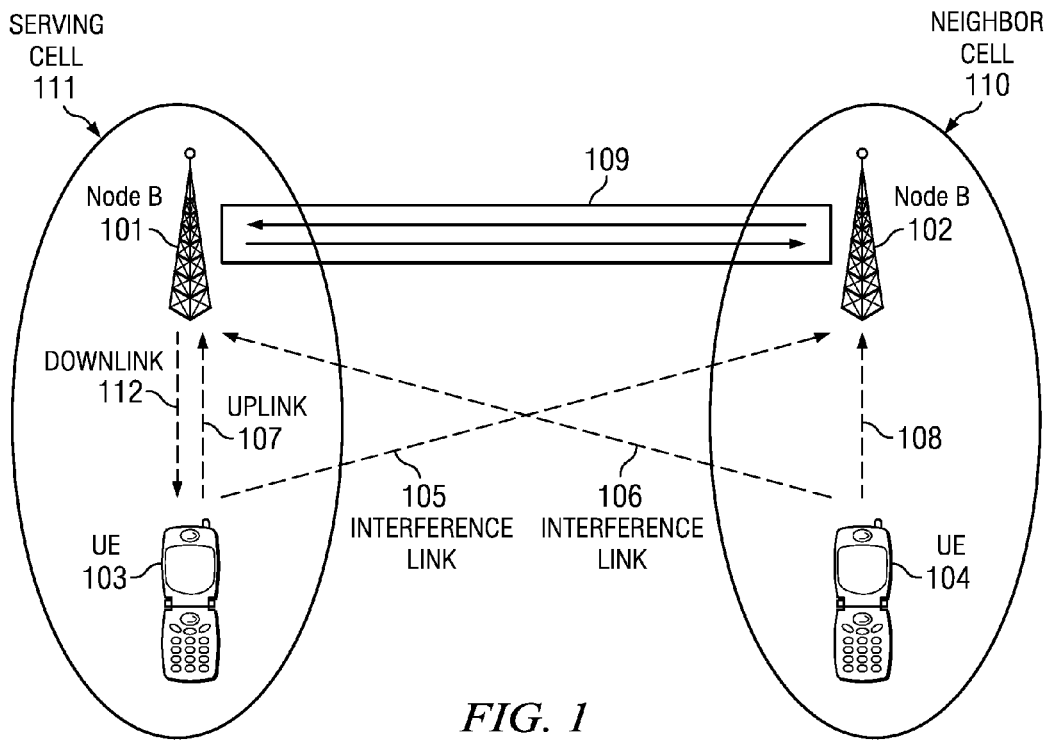
FIG. 1 is a representation of two cells in a cellular communication network that includes an embodiment of FDM band-specific information exchange.
Figure 2:
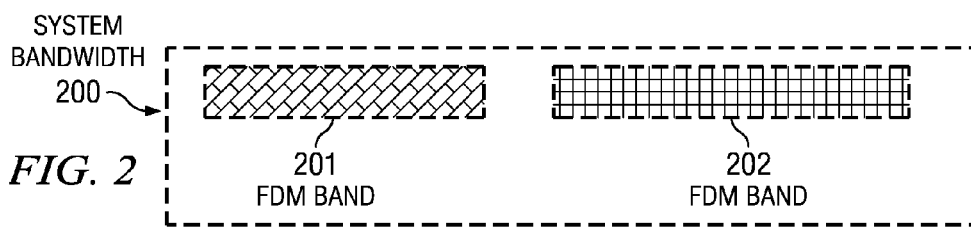
FIGS. 2-4 illustrate various exemplary ways of partitioning system bandwidth into at least two FDM bands.
Figure 3:
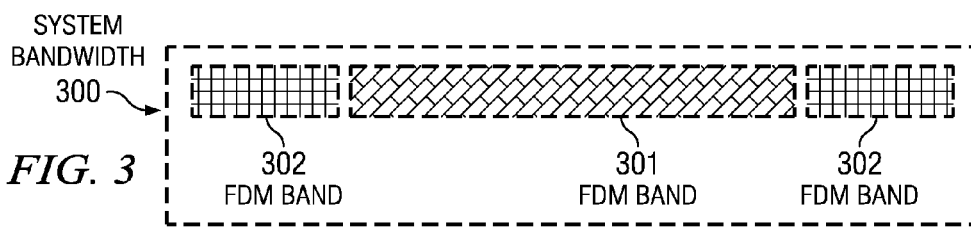
Figure 4:
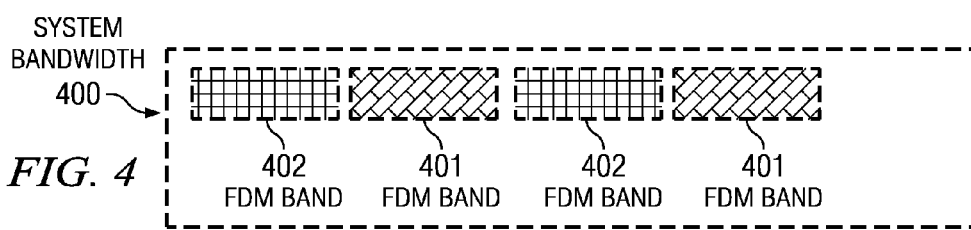

FIG. 1 shows an exemplary wireless telecommunications network. The illustrative telecommunications network includes representative NodeBs 101, 102, which are also referred to as base-stations. In this representation only two cells 101, 102 are illustrated for simplicity, but it should be understood that a typical network includes a large matrix of cells and each cell is generally completely surrounded by neighboring cells. Each of NodeBs 101 and 102 are operable over corresponding cells 111 and 110, respectively. However, it should be understood that a typical NodeB can serve multiple cells. Handset or other UE 103 is shown in cell 111, which is served by the NodeB 101. NodeB 101 is transmitting to and receiving transmissions from UE 103. Uplink radio transmissions from 103 to 101 are shown as 107, whereas downlink radio transmissions are 112. Interference to link 107 is generated by 104 through the radio channel 106. Similarly, UE 103 also generates interference via radio channel 105. As discussed above, in some embodiments, FDM band-specific parameters may be provided such that UE 103 transmits with different power configurations depending on which FDM band it is using at any given time. To this goal, note that FIG. 2 shows the entire system bandwidth 200, partitioned into at least two FDM bands, namely FDM band 201 and FDM band 202. Note that the system bandwidth partition doesn't have to be contiguous. To illustrate this, FIG. 3 shows a system bandwidth 300 divided into at least two FDM bands 301 and 302. Similarly, FIG. 4 shows system bandwidth 400 divided into at least two FDM bands 401 and 402. Backhaul link 109 between NodeB 101 and NodeB 102 is also shown in FIG. 1. In some embodiments, the backhaul 109 link serves for exchange of FDM band-specific cell parameters.

The UE equipment 103 is currently in cell 111 and is being served by NobeB 101. Cell 110 can be a neighbor cell and the NodeB 102 is not serving UE 103; however, NobeB 102 is serving UE 104 as represented by respective transmission 108. It is to be understood that typically each cell will contain dozens or hundreds of UE, but the operation of each will be the same as described herein. In this embodiment of band-specific cell parameters, each NodeB 101, 102 derives a set of FDM band-specific cell parameters for at least one of the FDM bands that are being used within the respective cell. As part of this derivation process, NodeB 101, for example, may also monitor transmissions from UE in neighboring cells, such as UE 104, as illustrated by respective representative interference link 106. In a similar manner, NodeB 102 will derive a set of FDM band-specific cell parameters by monitoring signals from served UE within their respective served cells and also by monitoring (interfering) signals from non-served UEs in neighboring cells.

In some embodiments, FDM band-specific information exchange between NodeBs is performed using the backhaul network. The backhaul network is, in some embodiments, the backbone network. In other embodiments, the backhaul network is achieved by direct links between NodeBs serving near-by cells. Unlike in the radio network controller (RNC)—based network, information which is communicated from one NodeB is not processed by the network. Rather, in some embodiments of the present invention, the network only attempts the delivery of the exact sent information, from one NodeB to another. Consequently, no radio network controller (RNC) is required. In some embodiments, the backhaul network can be all—IP network, or the internet. Timely delivery of the frequency band-specific information is preferred, and thus, delivery latencies can be of concern. Consequently, a high quality of service (QOS) parameters can be awarded to the FDM band-specific information which is exchanged between NodeBs. In other embodiments, the FDM band-specific information exchange from one NodeB to another can occur through a UE.

A serving cell site is defined as the cell site which controls the transmission of a UE. Each cell site is controlled by a NodeB. However, one NodeB can control multiple cell sites. Consequently, within a cell a UE is said to be a served UE and the NodeB is the serving NodeB of that cell site. A non-serving cell site of a UE is defined to be a cell site that does not directly control the transmission of the UE. Moreover, closed loop power control is defined as a power control mechanism in which explicit power control commands are issued from a serving cell site to its serving UEs to control their transmission power levels. Closed-loop power control command can sometimes be regarded as an absolute directive on power settings on the UE. However, in the literature, the term closed-loop typically refers to a differential power control (sending power changes with respect to previous power settings). Open loop power control schemes adjust the power control parameters at either a cell site or UE, without explicit power control commands from a serving cell site to its serving UEs.

For OFDMA based systems, including Single Carrier Orthogonal Frequency Division Multiple Access (SC-OFDMA), including Discrete Fourier Transform (DFT) spread OFDMA, channels can be distinct sub-carrier sets, also called resource blocks (RB). Alternatively, channels can be collections of RBs. For CDMA based systems, channels can be sets of access signature codes. Thus, reference herein to frequency division multiplexing (FDM) bands will be understood to refer to either one resource block (RB), or a collection of resource blocks. For example, in different embodiments, a notion of an FDM band could range from one to 100 resource blocks (RBs). In the 3GPP EUTRA wireless standard, a size of the resource block (RB) has been adopted to be 180 kHz, which is also a granularity at which FDM bands can be allocated to UEs. The choice of 180 kHz RB will optimize the system performance, even when applied in conjunction with FDM band-specific information exchange. Consequently, in some embodiments of the invention, and FDM band is an integral multiple of a resource block (RB), which is an integral multiple of 180 kHz. Such choice of an FDM band is important since, with typical channels being deployed, the coherence bandwidth is approximately 180 kHz. Consequently, interference statistics, incurred at adjacent NodeBs, will stay approximately constant across the resource block (RB). However, to reduce signaling overhead, an FDM band can be understood to be a collection of resource blocks. Furthermore, since embodiments of the invention refer to a plurality of FDM bands, different FDM bands can have different sizes. For instance, a first FDM band can be substantially narrower than the second FDM band. In other embodiments, sizes of FDM bands can be substantially similar. Each FDM band need not be contiguous in nature. Rather, it can be composed of pieces of spectrum.

Band-specific information exchange occurs between NodeBs. Band-specific information exchange can be in reference to future activity or in reference to past activity. In some embodiments, band-specific information exchange is in reference to past activity. In these embodiments, a NodeB typically performs band-specific measurements, processes them, and exchanges them with other NodeBs through the backhaul network. In other embodiments, band-specific information exchange is in reference to future activity. In such embodiments, FDM band-specific scheduling information (which will be applied at the UE in future sub-frames) is exchanged between NodeBs through the back-haul network. However, it is not precluded that a NodeB communicates both past and/or future scheduling decisions and past measurements through the back-bone network.

In some embodiments of the invention, a NodeB derives FDM band-specific parameters as follows. First a NodeB performs at least one measurement on the FDM band. This measurement can be a measurement of any of the following (or a combination thereof): received signal power, interference power, thermal noise power, signal to interference power ratio (SIR), signal to interference and noise power ratio (SINR), throughput measurement, throughput measurement for a group of UEs (e.g. cell-edge throughput), handover measurement, handover indicator measurement, signal rise-over thermal (signal RoT), interference rise-over thermal (interference RoT), signal and interference rise over thermal (signal and interference RoT), or any other measurements NodeB measurement defined by the standard being deployed. Thus, in some embodiments of the invention, an FDM band-specific RoT measurement is made. This measurement is then processed, for instance, quantized, compared with some pre-defined value, or other. In some embodiments, if the measured RoT exceeds a specific pre-defined value, a FDM band-specific overload indication is sent to at least one (presumably adjacent) NodeB, which serves an adjacent cell. In this embodiment, the FDM-specific overload indication refers to the FDM band that the measurements are performed on. Thus, in order to derive at least one band-specific cell parameter, each cell's serving base station (NodeB) monitors parameters on each channel (FDM channel), which can include one or more of the following: signal power, interference power, channel throughput and/or performance, cell-edge throughput and/or performance, cell-load and/or number of users in the scheduler range, any other channel parameter that is currently monitored on a cell basis or may be later found to be useful.

Now, in contrast, we focus on a NodeB which receives the band-specific parameter (or more parameters). The receiving NodeB can undertake actions to adjust transmissions of its UEs, in accordance to the value of the parameter. For example, in some embodiments of the invention a received parameter is a band-specific overload indication. Suppose that the overload indication was indicative of excessive interference in an adjacent cell. In some embodiments, the receiving NodeB stops scheduling UEs on the associated FDM band for a certain period of time (if e.g. overload indication was overly excessive). Thus, interference to adjacent cells is reduced. In other embodiments, the receiving NodeB undertakes actions to reduce transmission power for UEs which are transmitting on the associated band, where the overload indicator has signaled e.g. moderately excessive interference. Thus, in some embodiments, the NodeB which receives e.g. moderately excessive interference indication sends a power-down (by x dB for example) command to UEs transmitting on the associated FDM band. This power down-command can be UE-specific. However, in some embodiments, the power-down command can be FDM band-specific, and thus a UE which happens to be scheduled on the associated FDM band reduces power. In such embodiments, a scheduling decision (which FDM band) also affects transmission power. In such embodiments, power control commands can be specific to a group of UEs, where the group is defined as those UEs which are scheduled on the associated FDM band. Such signaling can reduce downlink overhead.

In other embodiments, the NodeB which receives an excessive FDM band-specific interference indication can undertake more subtle actions to reduce interference to adjacent cells. For example, in some embodiments, power settings of the UE are also controlled through radio resource configured (RRC) power-control parameters. These RRC parameters are typically signaled through higher layers. Thus, in some embodiments, the RRC power configuration of a UE is FDM-band specific. In some embodiments, the RRC power configuration can even have different parameters, depending on the FDM band. Thus, in some embodiments, the NodeB signals at least two power configurations for a UE. First power configuration is valid for a first FDM band, and a second power configuration is valid for a second FDM band. The UE power is then determined once the UE also receives an actual scheduling message. If the scheduling message is indicative of the first FDM band, first power configuration is applied, and if the scheduling message is indicative of the second FDM band, the second power configuration is applied.

Thus, in some embodiments power control adjustments are FDM band-specific. For example, a particular UE can receive x dB reference power up command on first FDM band, and y dB reference power down on second FDM band. Thus, when, in present or in future, the said UE is scheduled on first FDM band, it applies a different transmit power from when it is scheduled on the second FDM band. There can be two different kinds of FDM band-specific power control commands: (a) power control command which adjusts a reference power, which becomes relevant (i.e. applied) only when the UE becomes scheduled on a corresponding FDM band, and (b) the power control command which is associated with the scheduling grant, and expires after. Upon, expiration, the reference power on the FDM band is maintained as before. Same principle can be applied for both absolute and differential power control commands. In other embodiments, a given differential power control command can be FDM band-specific. For example, if a UE receives an "up" power command, this can be interpreted as up by x dB if the UE is scheduled on first FDM band, and up by y dB is the UE is scheduled on second FDM band.

Each cell's serving NodeB processes the measured parameter(s). This processing can be on a per-channel basis, or on a per-collection of channels basis. This processing can be either quantization, or it can be further processing which allows a cell to make inferences about its parameters or about adjacent cells parameters. Processed parameters, or inferences thereabout, are then forwarded or broadcast to other cells in the network, on a per-channel basis, or on a per-collection of channels basis. Typically, the set of band specific cell parameters will be forwarded to adjacent, neighboring cells' NodeBs. However, depending on cell topography they may also be forwarded to more remote cells. In some embodiments, sets of band specific cell parameters from many different cells may be transferred to a central coordinating system that coordinates the scheduling and control of a large number of cells. In some embodiments, FDM band-specific power adjustments mean that both the serving cell and a particular UE maintain a distinct reference transmit power for each FDM band. Thus, whenever a UE is scheduled on a particular FDM band, the UE transmits with the band-specific reference power. If additional power corrections are applied with the scheduling grant, then the UE incorporates the power corrections into the transmit power settings together with the reference power.

Thus, as a simple example of the embodiment, in OFDMA based systems, each cell can monitor interference in groups of RBs or even on an individual RB basis. If this interference exceeds a threshold, then per-group or per-RB overload indicator is sent or broadcasted to adjacent cells. This would be an example of frequency selective overload indicator, sent over the network backhaul. On the flip side, each cell receives processed parameters from adjacent cells, on a per-channel (FDM band) basis. Then, each cell's NodeB combines these processed parameters with its own measurements and uplink signaled parameters. From these combinations, the NodeB may do one or more of the following: (a) Issue per-UE specific, per FDM band-specific, power spectral density adjustments, (b) Adjust (FDM band-specific) parameters of the open-loop power control, or (c) select FDM band-specific scheduling allocations to avoid current or future conflict with FDM band-usage in nearby cells.

Band-specific power adjustments in actual transmission from a UE only apply to the UE when the UE is scheduled on that particular channel. Thus, if the UE is not scheduled on a particular channel, the power density adjustments are just used for future reference. Then, whenever the UE becomes scheduled on a particular channel, the transmit power for that particular channel, which is inferred from band-specific power density commands received from the serving NodeB, is already determined.

As an example of the embodiment, we consider a scenario where the power control equation is $P[k]=\min\{P_{MAX}, 10\log_{10}(M[k])+P_0+\alpha\ PL+\Delta_{TF}[k]+g[k]\}$, where the said power control equation is calculated at the UE. The above equation is in the dBm scale. In the above equation, $M[k]$ is the number of resource blocks that the transmission has been scheduled on, at sub-frame k. Also, the $P_{MAX}$ is the maximum transmission power at the UE, which is pre-defined based on the UE power class. Parameter PL is the downlink path loss estimated at the UE (or alternatively at the NodeB). Parameter $\Delta_{TF}[k]$ is the power increase or reduction due to the modulation and coding adjustment (sometimes referred to as the TF=transport format), which is thus dependent on the choice of channel code rate and modulation. The $g[k]=g[k-1]+\delta$ is a differential power accumulation. Finally, the value $P_0$ is a nominal component, which can be either broadcasted to UEs or informed using RRC signaling. The set of said parameters $(P_0, \alpha, \Delta_{TF}[k], g[k])$ can be called a UE power configuration. Note that a UE power configuration exists even when the UE is silent, because these parameters are maintained in the memory of the UE. Transmission power is applied only when the UE is actually scheduled. As an example of the embodiment, a number of the above parameters can be FDM band-specific. In one embodiment of the invention the parameter $\alpha$ is FDM band-specific. Thus, a first FDM band can have a different value of $\alpha$ than the second FDM band. Furthermore, either one of these values can be fixed (such as $\alpha=1$), and non-configurable, or both can be configured. In another embodiment of the invention, the nominal value $P_0$ is also band-specific. Thus, here, first FDM band can have (first) either fixed or downlink (DL) signaled value of $P_0$, all the while second FDM band has (second) either fixed or downlink (DL) signaled value of $P_0$. In another embodiment of the invention, the $\Delta_{TF}[k]$ is differently configured for different FDM bands. For example, a first FDM band has a first configuration for $\Delta_{TF}[k]$ while the second FDM band has a second configuration of $\Delta_{TF}[k]$. In another embodiment of the invention, differential power accumulation $g[k]$ is differently computed for first FDM band and second FDM band, for example, $g[k]=g[k-1]+\delta$, where $\delta$ can be differently configured for the first and the second FDM band. In one embodiment, physical uplink shared channel (PUSCH) and physical uplink control channel (PUCCH) are transmitted on two separate FDM bands. For example, first FDM band is PUSCH and second FDM band is PUCCH. The set of said parameters $(P_0, \alpha, \Delta_{TF}[k], g[k])$ can be called a UE power configuration (for sub-frame k), with potentially some other parameters being present, in some embodiments. In other embodiments, a reduced or alternate set of parameters can be used (for example, ($P_0$, α, δ) as a power configuration). Note that the UE power configuration is signaled, and is not utilized by the UE until the UE is actually scheduled. Only once the UE is scheduled, the configuration is applied. Thus, in some embodiments, the set of parameters ($P_0$, α, $\Delta_{TF}[k]$, g[k]) is FDM band-specific, and thus, different power settings are applied depending on whether the UE is scheduled on the first FDM band or on the second FDM band. In essence, there can exist two sets of power configurations, like ($P_0$, α, $\Delta_{TF}[k]$, $g[k])_{FDM1}$ which is the first configuration and a ($P_0$, α, $\Delta_{TF}[k]$, $g[k])_{FDM2}$ which is a second configuration. Note that some elements of power configuration can be updated using DL signaling (power configuration message), while others can be simply fixed. Thus, in some embodiments of the invention, a power configuration message is any message which updates values for the elements of the set ($P_0$, α, $\Delta_{TF}[k]$, g[k]). Such message or messages can be achieved through signaling in physical downlink control channel (PDCCH), or through RRC signaling, which can be done through physical downlink shared channel (PDSCH). In other embodiments, elements of power configuration can be added and maintained as a reference power configuration (possibly including a δ)).

In other embodiments of the invention, FDM band-specific parameters are shared through the back-haul network, where the parameters are computed using information produced by the scheduler of the NodeB. Usually, information produced by the scheduler of the NodeB pertains for future transmissions, which is the case in some embodiments. In other embodiments, scheduling information for previous transmissions can be used. Scheduling information incorporates identity of a UE, together with an FDM band (or a sub-band, i.e. part of the FDM band) that the UE has been scheduled on, together with the choice of modulation to be used, together with the choice of channel coding scheme to be used, together with a schedule duration. Elements of the enumerated list are produced by the scheduler, where the scheduler can also produce additional information, in some embodiments. Thus, in some embodiments, the scheduler belonging to a NodeB produces scheduling information. This scheduling information can then be processed, in some embodiments. This processing can be, for instance, simple extraction of the elements of scheduling information. Other, more complicated processing is not precluded. In some embodiments, a NodeB looks up if a cell-edge UE has been scheduled, and if so, it sends an advanced warning to another NodeB, through a backhaul network. This advanced warning can also include the FDM band where the cell edge UE has been scheduled, together with additional information. In some embodiments, the receiving NodeB can then choose to avoid scheduling another cell-edge UE on the said FDM band. Note that a ping-pong effect can occur, where NodeBs keep changing the schedule, which in turn keeps colliding. In some embodiments, this is resolved by a-synchronicity, where different NodeBs send their processed scheduling information through the backhaul network at different times.

In other embodiments of the invention, a number of UEs which is scheduled for future transmissions can be shared as FDM band-specific information. For example, if more than one UE is scheduled in future on a particular FDM band (by a first NodeB), an indicator can be sent to a second NodeB that UL virtual-MIMO (multiple input-multiple output) transmission is to be used, which will create more interference to that FDM band. Consequently, the second NodeB can attempt to adapt the parameters of its own transmission in order to either avoid interference or to mitigate it.

In other embodiments of the invention, the identity of the UE which is scheduled for transmission in a future sub-frame, on a particular FDM band, is communicated via the backhaul network, from the first NodeB to the second (non-serving) NodeB. The second NodeB, can thus, based on its own prior measurements, and knowledge of which interfering UE is to be scheduled, adapt parameters of transmission for its serving UEs. In some embodiments of the invention, a simple intent to interfere on a particular FDM band is communicated from first NodeB to a second NodeB. The second NodeB is then informed about impending interference, and thus, it can adapt parameters of transmission for its serving UEs. In some embodiments, the second NodeB simply reduces the modulation order for UEs which are to be scheduled on the FDM band. In other embodiments, the second NodeB increases the channel coding rate for UEs which are to be scheduled on the FDM band. Thus, interference prediction is achieved, and system throughput can be improved. In some embodiments, the first NodeB is allowed to send an update of the intent to interfere on a particular FDM band, during a particular sub-frame. In such cases, the second NodeB can consider only the intent message which arrives the last (i.e. any prior message for a particular sub-frame and FDM band is over-ridden). In other embodiments, all messages about the intent to interfere are combined.

Figure 7:
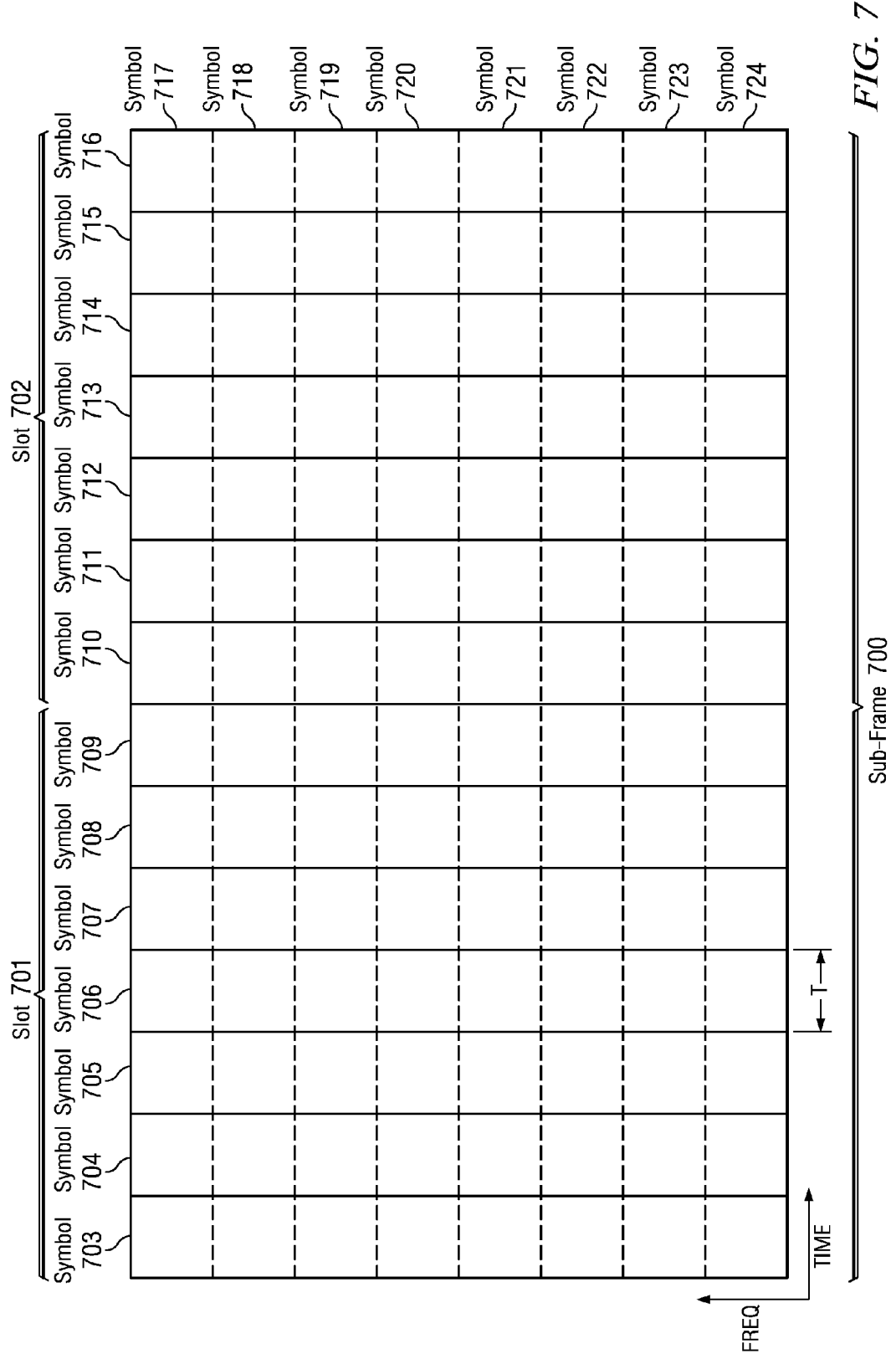
FIG. 7 is a time vs frequency plot illustrating an uplink sub-frame with several representative resource blocks used for frequency division multiplexing (FDM) for wireless communication in the network of FIG. 1.

FIG. 7 is an illustrative format of an UL sub-frame 700 for use in the network of FIG. 1. Elements of the present invention will be described in the context of EUTRA sub-frame 700, even though its applicability is broader. FIG. 7 describes transmission of EUTRA sub-frame 700 comprising two slots 701 and 702. Duration of the EUTRA sub-frame is 1 ms, which means that duration of two slots 701 and 702 is 0.5 ms each. Each slot comprises 7 symbols. For example, slot 701 comprises symbols 703, 704, 705, 706, 707, 708, 709. The slot 702 comprises symbols 710, 711, 712, 713, 714, 715, 716. Demodulation Reference Symbols (DM RS) are sent in 706 and 713, and are used to derive channel estimates which are needed for coherent demodulation of the remaining Symbols. Furthermore, Demodulation Reference Symbols, as received, can be used to compute estimates of interference, as common in prior art. In addition to 706 and 713, there may be, at times other RS, which are the sounding reference symbol (RS). Sounding RS can be configured by the NodeB. Position of the sounding RS is debated. Each symbol has a time duration equal to approximately T, which is a function of the slot time. In this embodiment, the slot time is 500 μsec. Since the first symbol in the slot has more cyclic prefix samples, not all symbols are exactly equal in duration, as per TS36.211. Nevertheless, all symbols can be considered to be approximately equal in duration, which doesn't exceed 75 μsec. Note that if all symbols were exactly equal in duration, the symbol time T would approximately be equal to 500 μsec/7=71.4 μsec. FIG. 7 also illustrates several resource blocks (RBs), namely RBs 717-724. An FDM band can comprise one or more resource blocks. Note that this plot illustrates only 8 RBs, but it should be understood that many more RBs can be used in a typical network deployment. Time-wise, each transmission is performed as a series of symbols for the duration 700. Typically a wideband sounding reference signal (SRS) can be transmitted with each sub-frame that can be used by the NodeB for power, signal quality and timing variation measurement purposes. In such cases, the SRS can be applied to a group of RBs, and the transmission of the SRS can be wide-band when compared with other transmissions from the UE which transmits SRS. Also, within each frame there are typically one or more narrow band demodulation reference signals (DMRS), sent for the duration 706 and 713, which can be used to determine individual channel power and interference levels. When a particular UE receives a grant to transmit, it transmits one or more a sub-frames on a particular group of RBs that is allocated by the scheduler in the serving NodeB. The scheduler may also allocate a single RB, or if the UE has a lot of data to transfer it may be allocated several or many more RBs to use in parallel, depending on traffic loads from other UE within the cell. Over time, a given UE may be allocated a particular RB or group of RBs, and then later by allocated a different RB or group of RBs. In some embodiments of the invention, an FDM band is a specific group of RBs, which can be pre-determined. For example, PUCCH comprises two or more RBs from the two edges of the system spectrum, while the PUSCH is in the interior of the system spectrum. In some embodiments, PUCCH and PUSCH are the two different FDM bands (first and second, or second and first). In one embodiment, measurements based on the wideband SRS may be used to derive FDM band-specific cell parameter(s) that apply to a group of RBs that are covered by the SRS. In another embodiment, measurements based on the narrow band DMRS may be used to derive FDM band-specific parameters that apply to an individual RB. In this embodiment, each individual RB has a bandwidth of 180 kHz. In 3gpp EUTRA, a RB, which is a resource block, comprises 12 sub-carriers (i.e. tones).

Figure 6:
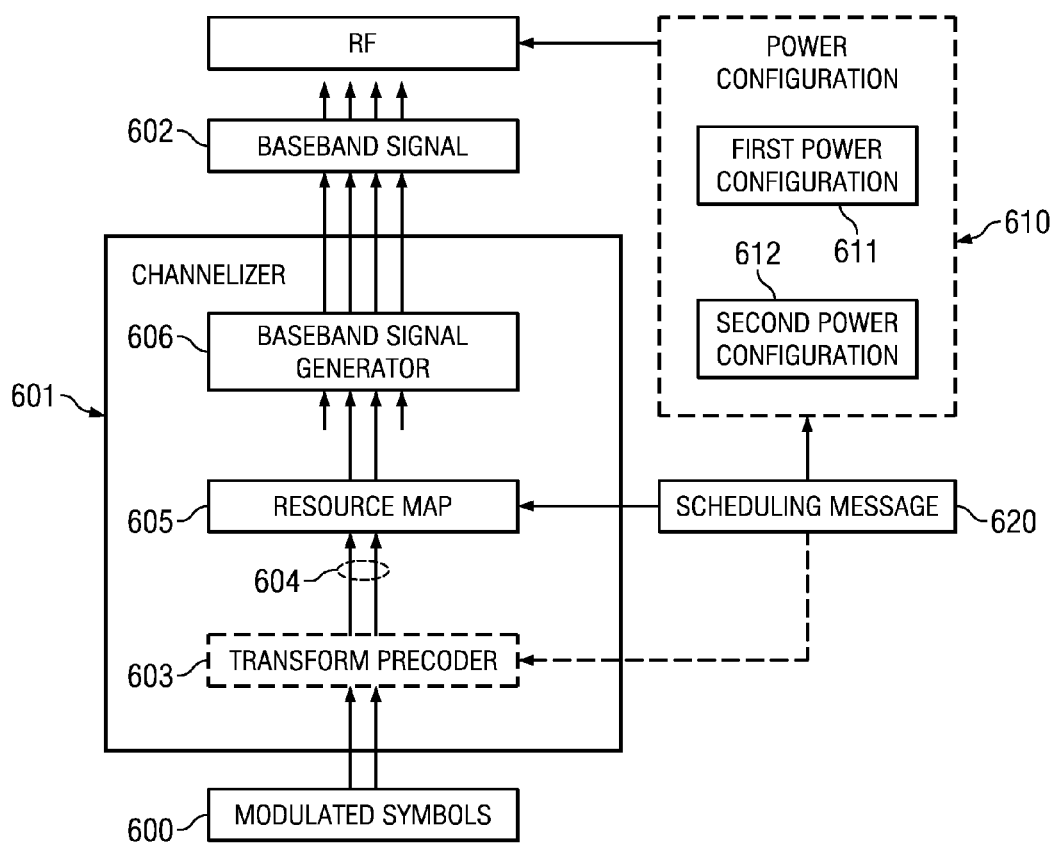
FIG. 6 is a block diagram of a UE transmitter in accordance with an embodiment of the invention.

FIG. 6 is a block diagram which illustrates a UE transmission in accordance with an embodiment of the invention. In FIG. 6. channelizer 601 can be used to form symbols of the sub-frame in FIG. 7. The channelizer of FIG. 6 begins with complex modulated samples, which can belong to a constellation such as BPSK, QPSK, 8-PSK, 16 QAM, 64 QAM or some other constellations. This however, is not mandatory. Modulated Symbols 600 can be transformed by the Transform Pre-Coder 603. One example of the Transform Pre-Coder 203 is $z[k]=\beta \Sigma_i d[i]\exp(-j2\pi ki/L)$, where sum $\Sigma_i$ extends across all indexes "i" in $\{0,1,\ldots,L-1\}$, where "j" is the complex unit, where $\pi$ is the well-known constant (approximately 3.14), where d[i] are symbols of the sequence 600 which enters the Transform Pre-Coder 603, where "L" is the length of both the sequence which enters (600) and the sequence which is outputted (604) by the Transform Pre-Coder 603, where $\beta$ is a normalization constant (e.g. inverse square root of L). Note the "L" can be the number of tones allocated on PUSCH, for this particular mobile UE. In some embodiments, the Transform Pre-Coder 603 can be implemented using a Discrete Fourier Transform (DFT). Transform Pre-Coder 603 is coupled to the Resource Map 605, which describes the set of tones which are allocated to the UE for the present sub-frame. Resource Map 605 is coupled with the Baseband Signal Generator 606. Thus, the Resource Map 605 maps said samples z[k] onto a[m], which is the input to the Baseband Signal Generator. Thus, in some embodiments, sequence of a[m] contains samples of the sequence z[k], along with some other possible samples (e.g. zero-insertion). One possible embodiment of the Baseband Signal Generator 606 is given by formula $s(t)=\Sigma_m a[m+c] \exp[j2\pi(m+\frac{1}{2})(t-N_{CP}T_S)\Delta f]$, where the sum $\Sigma_m$ ranges over m. In accordance to the 3GPP specification TS36.211, as $T_S=1/(15000\times 2048)$ where "x" is just multiplication. Here, $\Delta f$ is 15 kHz. Here, $N_{CP}$ is the number of Cyclic Prefix (CP) samples, which can be transmitted for every symbol, as common in OFDM-based systems. Also note that $N_{cp}$ can be symbol-dependent. Here, t is the continuous-time variable whose range is as $0 \leq t \leq (N+N_{CP})T_S$ where N=2048. Here, sequence a[m+c] is assumed to have M non-zero elements. Here, c is just an offset, which can be equal, for example, to floor(M/2). In this case, the sum $\Sigma$ ranges over "m" inside the set $\{-\text{floor}(M/2), -\text{floor}(M/2)+1, \ldots, \text{ceil}(M/2)-1\}$, where floor is the known "floor" function and "ceil" is the known ceiling function. Note that "m+½" in the above sum performs a frequency offset of ½ tone, implemented in the baseband, for purpose of DC-offset mitigation of the Direct Conversion problem. Note that this is just an embodiment of the Baseband Signal Generator 606, and other embodiments, which different specific numbers are possible. Thus, different modifications to the Baseband Signal Generator 606 are possible, which don't affect the scope of the Present Invention. Components of the Baseband Signal Generator can be implemented using the Inverse Discrete Fourier Transform (IDFT).

In some embodiments of the invention, as shown in FIG. 6, the Scheduling Message 620 is used to configure the Resource Map 605, and to select the Power Configuration. The Scheduling Message 620 can be communicated to the UE in the physical downlink control channel (PDCCH), and it contains, among other things, the selection of which RBs should the UE utilize. Consequently, the Scheduling Message configures the set of tones which the UE uses. However, in the embodiment of the invention, the Scheduling Message 620 is also used to determine the power configuration 610 of the UE. The Power Configuration of the UE is selected from the set of at least First Power Configuration 611 and Second Power Configuration 612. In some embodiments, Power Configuration of the UE can contain any of the parameters ($P_0$, $\alpha$, $\Delta_{TF}[k]$, g[k]) as described before. Thus, in the embodiment of the invention, if the Scheduling Message 620 is indicative of the first FDM band, then a First Power Configuration 611 is selected, and if the Scheduling Message 620 is indicative of the second FDM band, then a Second Power Configuration 612 is selected. In cases where the Scheduling Message is not present, a default power configuration can be selected from the set of at least First Power Configuration and Second Power Configuration. In some embodiments, the Scheduling Message 620 is derived by combining multiple downlink control (PDCCH) transmissions. Thus, the Scheduling Message 620 comprises information which is derived from downlink control signals (PDCCH signaling or RRC signaling), and which indicated which FDM band should be used for transmission. In some embodiments, first FDM band is PUCCH and second FDM band is PUSCH, or vice-versa. Note that Scheduling Message 620 can also narrow-down which RBs specifically are to be used, since an FDM band can comprise multiple RBs. In some embodiments, the Scheduling Message 620 can also configure (implicitly or explicitly) whether the transform pre-coder is to be used or not, which is also indicated in the diagram from FIG. 6.

Figure 5:
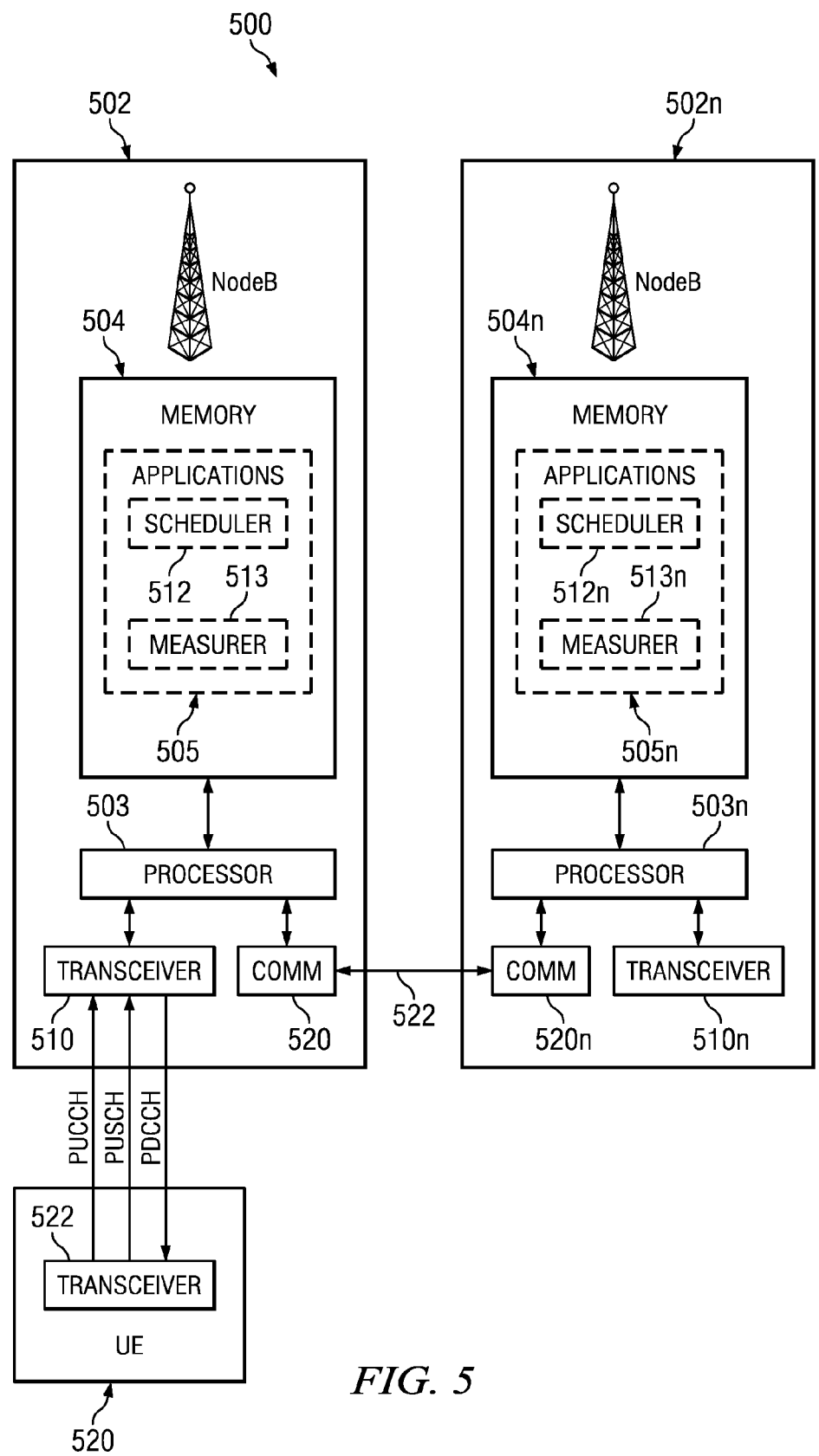
FIG. 5 is a block diagram of a UE and multiple interconnected base stations in the network of FIG. 1.

FIG. 5 is a block diagram of a UE 520 and multiple interconnected base stations 502, 502n in the network of FIG. 1. As shown in FIG. 5, wireless networking system 500 comprises a mobile UE device 520 in communication with a serving NodeB 502. The mobile UE device 520 may represent any of a variety of devices such as a server, a desktop computer, a laptop computer, a cellular phone, a Personal Digital Assistant (PDA), a smart phone or other electronic devices. In some embodiments, the electronic mobile UE device 520 communicates with the NodeB 502 based on a LTE or E-UTRAN protocol. Alternatively, another communication protocol now known or later developed can be used. In some embodiments of the invention, channels PUSCH and PUCCH are on different FDM bands and are configured by first and second power configurations, respectively.

Mobile UE device 520 comprises a processor coupled to a memory and a Transceiver 522 that is controlled by the processor. Transceiver 522 includes a receiver for receiving transmissions form a serving NodeB 502 and a transmitter similar to that described with respect to FIG. 6 for transmitting to the serving NodeB. The memory stores (software)

applications for execution by the processor. The applications could comprise any known or future application useful for individuals or organizations. As an example, such applications could be categorized as operating systems (OS), device drivers, databases, multimedia tools, presentation tools, Internet browsers, e-mailers, Voice-Over-Internet Protocol (VOIP) tools, file browsers, firewalls, instant messaging, finance tools, games, word processors or other categories.

Regardless of the exact nature of the applications, at least some of the applications may direct the mobile UE device 520 to transmit uplink (UL) signals on a physical uplink shared channel (PUSCH) to the NodeB (base-station) 502 periodically or continuously via its transceiver. A request for transmission resources is made via a physical uplink control channel (PUCCH). A scheduling grant is received from the serving NodeB via the physical downlink control channel (PDCCH). In some embodiments, serving NodeB 502 may provide two or more sets of power configurations for the UE to use during its transmission.

As shown in FIG. 5, NodeB 502 comprises a Processor 503 coupled to a memory 504 and a transceiver 510. The memory 504 stores applications 505 for execution by the processor 503. The applications 505 could comprise any known or future application useful for managing wireless communications. At least some of the applications 505 may direct the base-station to manage transmissions to or from the user device 520. For example, scheduler application 512 is responsible for scheduling transmissions of 520. Measurer application 513 is useful for measuring FDM band-specific cell parameters. The operation of scheduler 512 and measurer 513 are described in more detail above.

One of the applications directs NodeB 502 to derive a set of band-specific cell parameters. NodeB 502 sends all or a portion of these derived sets of band-specific cell parameters to other NodeBs 502n via a backhaul network 522 using communication manager 520. Communication manger 520 includes a transmitter for transmitting on the backhaul network and a receiver for receiving information from the backhaul network. NodeB 502 also receives sets of band-specific cell parameters from other NodeBs 502n via the backhaul network under control of respective communication manager 520n.

Transceiver 510 is a device used to sense and transmit radio signals. As would be understood by one of skill in the art, the components of the scheduler 512 may involve the physical (PHY) layer and/or the Media Access Control (MAC) layer. Transceiver 510 includes a receiver for receiving transmissions from various UE within range of the NodeB.

Uplink scheduler 512 executes instructions that control the operation of transceiver 510. Scheduler 512 controls the transmission resources allocated to each UE that is being served by NodeB 502 and sends band-specific power configurations via the physical downlink control channel PDCCH.

Figure 8:
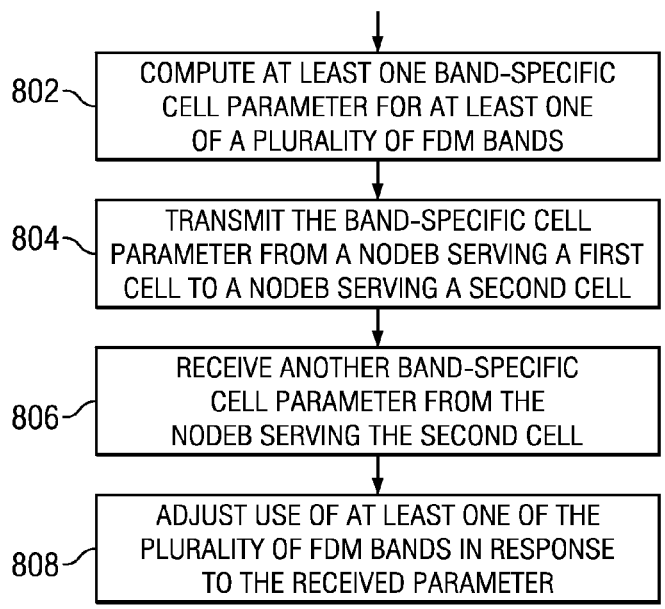
FIG. 8 is a flow diagram illustrating derivation of FDM band-specific cell parameters used in the network of FIG. 1.

FIG. 8 is a flow diagram illustrating derivation of FDM band-specific cell parameters for use in the network of FIG. 1. At least one FDM band-specific cell parameter is computed 802 for at least one of a plurality of FDM bands based on information relevant to the cell being served by the NodeB. As discussed above, each FDM band may be an individual channel or may be a group of resource blocks.

Each FDM band-specific parameter may be computed 802 in response to scheduling information developed by the NodeB for its served cell. This scheduling information may pertain to identities of UEs scheduled on the first FDM band, indicators if UEs scheduled on first FDM band belong to a class of high-interference UEs, number of UEs scheduled on first FDM band, power assignments of UEs scheduled on first FDM band, modulation of UEs scheduled on first FDM band, channel coding information for UEs scheduled on first FDM band, and/or schedule duration for UEs scheduled on first FDM band, for example, as described in more detail above.

Each band-specific parameter may be derived 802 in response to channel specific measurements made by the NodeB serving a respective cell. In this case, the measurements may be based on one or more of the following: interference power measurement, thermal noise power measurement, received signal power measurement, signal-to-interference-power-ratio (SIR) measurement, signal-to-interference-and-thermal-noise-power (SINR) measurement, rise-over thermal (RoT) measurement, throughput measurement, and cell-edge throughput measurement, for example, as described in more detail above.

A signal from each UE is monitored by its serving cell site and also by non-serving neighbor cell sites. Depending on cell layout, topography, obstructing objects, etc, not every neighbor of a given serving cell site will be able to measure signals from a particular UE. Based on the measured signal strength from a UE, both the non-serving cell sites and the serving cell site compute 802 band-specific cell parameters in response to transmissions from served and non-served UE.

After computing the sets of band-specific cell parameters, they are transmitted 804 to other NodeB. As discussed above, typically the other NodeB are adjacent neighbors, but there may be a central or regional controller that coordinates activity of a number of NodeBs. A single NodeB may serve several cells, therefore, band-specific information may be derived for one cell by a NodeB, and then "transmitted" to the same NodeB for use in another cell served by the same NodeB.

The neighboring cell sites communicate the sets of band-specific cell parameters through inter-cell communication networks. Upon receiving 806 band-specific cell parameters from neighboring non-serving cell sites, the serving cell site combines 806 the band-specific cell parameters from non-serving cell sites, together with its own derived band-specific cell parameters.

From this combination, the serving cell site can adjust 808 use of at least one of FDM bands in order to reduce or minimize interference between the served cell and neighboring cells. As described in more detail above, this adjustment in the use of the FDM bands may involve selectively scheduling use of a particular band by a UE in the served cell to avoid interference from use of the same band by a different UE in a neighboring cell. Alternatively, this adjustment in use of the FDM bands may involve sending two or more band-specific power commands to a particular UE so that the UE is enabled to transmit in different power levels, depending on the FDM band that is allocated for transmission.

Figure 9:
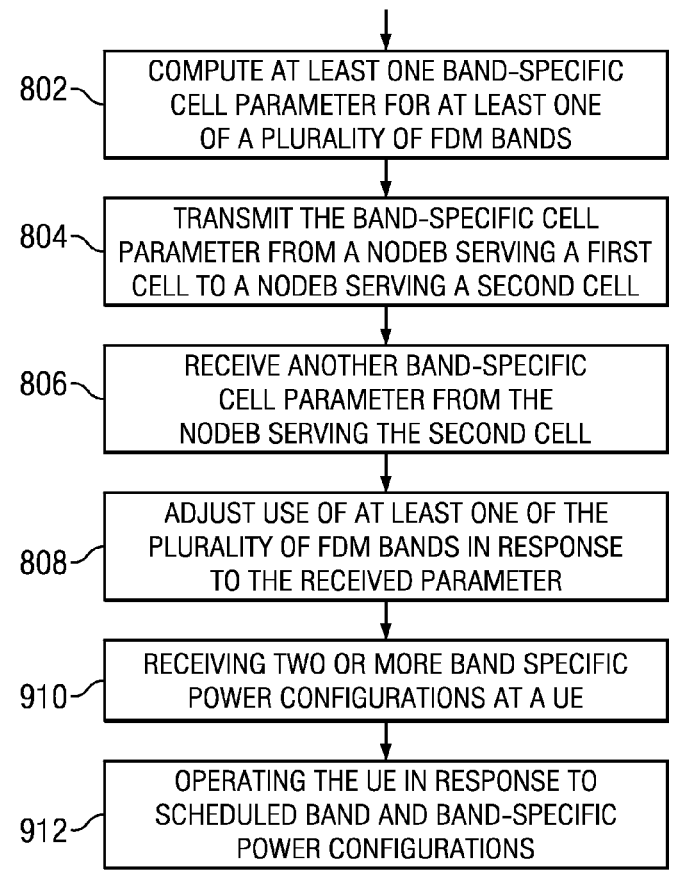
FIG. 9 is a flow diagram illustrating use of FDM band-specific cell parameters in the network of FIG. 1.

FIG. 9 is a flow diagram illustrating use of FDM band-specific cell parameters in the network of FIG. 1. As described with respect to FIG. 8, at least one band-specific cell parameter is computed 802, and then transmitted 804 to neighboring cells NodeBs, additional sets of band-specific cell parameters are received and combined 806 with the locally computed sets and use of the FDM bands within the cell are adjusted 808 accordingly.

These adjustments in use of the FDM bands are then transmitted to and received 910 by a particular UE served by the NodeB as two or more sets of band-specific UE configurations. In some embodiments, band-specific UE configurations are band-specific power configurations. In either case, as described in more detail above, a particular UE will operate 912 in a manner that is responsive to the band-specific configurations. For example, a given UE may transmit to the NodeB on a first FDM band using a first band-specific configuration, and then at a later time transmit to the NodeB on a second FDM band using a second band-specific configuration. In some embodiments, the UE utilizes a DFT pre-coder, and when doing so, a configuration is shared across all RBs (and thus, tones) which are coupled to the output of the DFT pre-coder. In some embodiments, either the First FDM band or the second FDM band is used for any given time duration, which achieves a transmission with a low peak to average power ration (PAPR). In other embodiments, both the First FDM band and the Second FDM band can be used simultaneously.

Figure 10:
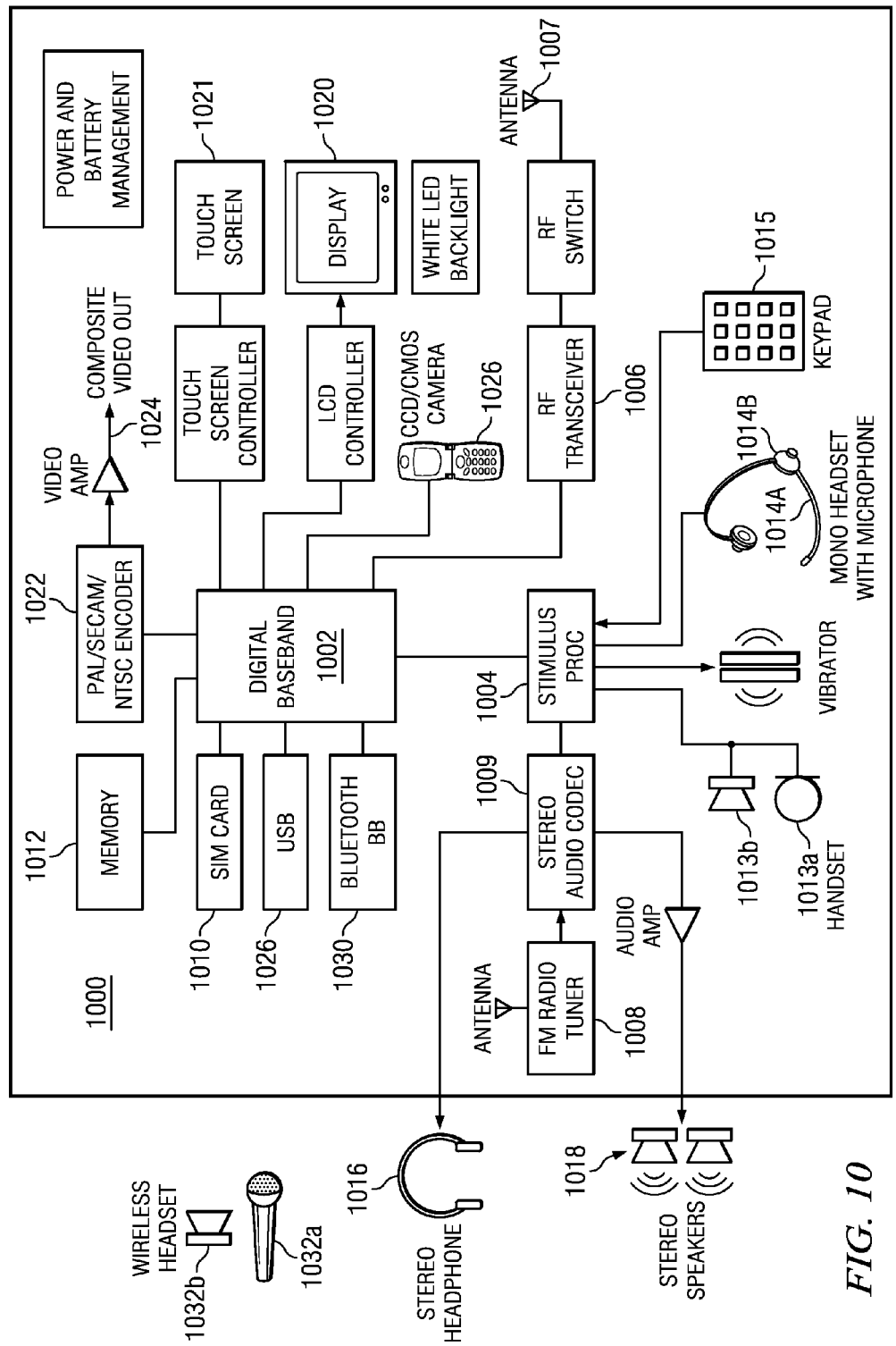
FIG. 10 is a block diagram of a mobile user device for use in the network of FIG. 1.

FIG. 10 is a block diagram of mobile cellular phone 1000 for use in the network of FIG. 1. Digital baseband (DBB) unit 1002 can include a digital processing processor system (DSP) that includes embedded memory and security features. Stimulus Processing (SP) unit 1004 receives a voice data stream from handset microphone 1013a and sends a voice data stream to handset mono speaker 1013b. SP unit 1004 also receives a voice data stream from microphone 1014a and sends a voice data stream to mono headset 1014b. Usually, SP and DBB are separate ICs. In most embodiments, SP does not embed a programmable processor core, but performs processing based on configuration of audio paths, filters, gains, etc being setup by software running on the DBB. In an alternate embodiment, SP processing is performed on the same processor that performs DBB processing. In another embodiment, a separate DSP or other type of processor performs SP processing.

RF transceiver 1006 includes a receiver for receiving a stream of coded data frames and commands from a cellular base station via antenna 1007 and a transmitter such described with respect to FIG. 6 for transmitting a stream of coded data frames to the cellular base station via antenna 1007. Transmission of the PUSCH data is performed by the transceiver using the PUSCH resources designated by the serving NodeB. In some embodiments, frequency hopping may be implied by using two or more bands as commanded by the serving NodeB. In this embodiment, a single transceiver can support multi-standard operation (such as EUTRA and other standards) but other embodiments may use multiple transceivers for different transmission standards. Other embodiments may have transceivers for a later developed transmission standard with appropriate configuration. RF transceiver 1006 is connected to DBB 1002 which provides processing of the frames of encoded data being received and transmitted by the mobile UE unite 1000.

The EUTRA defines SC-FDMA (via DFT-spread OFDMA) as the uplink modulation. The basic SC-FDMA DSP radio can include discrete Fourier transform (DFT), resource (i.e. tone) mapping, and IFFT (fast implementation of IDFT) to form a data stream for transmission. To receive the data stream from the received signal, the SC-FDMA radio can include DFT, resource de-mapping and IFFT. The operations of DFT, IFFT and resource mapping/de-mapping may be performed by instructions stored in memory 1012 and executed by DBB 1002 in response to signals received by transceiver 1006. As described in more detail above, band-specific power and scheduling configurations can be provided to a cell phone by the serving NodeB for use in controlling operation of the transmitter on a channel specific basis.

DBB unit 1002 may send or receive data to various devices connected to universal serial bus (USB) port 1026. DBB 1002 can be connected to subscriber identity module (SIM) card 1010 and stores and retrieves information used for making calls via the cellular system. DBB 1002 can also connected to memory 1012 that augments the onboard memory and is used for various processing needs. DBB 1002 can be connected to Bluetooth baseband unit 1030 for wireless connection to a microphone 1032a and headset 1032b for sending and receiving voice data. DBB 1002 can also be connected to display 1020 and can send information to it for interaction with a user of the mobile UE 1000 during a call process. Display 1020 may also display pictures received from the network, from a local camera 1026, or from other sources such as USB 1026. DBB 1002 may also send a video stream to display 1020 that is received from various sources such as the cellular network via RF transceiver 1006 or camera 1026. DBB 1002 may also send a video stream to an external video display unit via encoder 1022 over composite output terminal 1024. Encoder unit 1022 can provide encoding according to PAL/SECAM/NTSC video standards.

As used herein, the term "coupled" or "connected," means electrically connected, wire-line or wireless, including where additional elements may be in the electrical connection path. While the invention has been described with reference to illustrative embodiments, this description is not intended to be construed in a limiting sense. Various other embodiments of the invention will be apparent to persons skilled in the art upon reference to this description. While a mobile user equipment device has been described, embodiments of the invention are not limited to mobile devices. Desktop equipment and other stationary equipment being served by a cellular network will also participate in the channel-specific power control methods described herein. It is therefore contemplated that the appended claims will cover most such modifications of the embodiments as fall within the true scope and spirit of the invention In some embodiments, computing FDM band-specific cell parameters comprises performing described set of measurements for at least one FDM band (performing FDM band-specific measurements), followed by processing said measurements. This processing can include a simple pass-through, quantization, sorting, classification, aggregation, table look-ups, or any other form of digital processing. In some embodiments, computing FDM band-specific cell parameters is performed using information produced by the NodeB scheduler. The information produced by the NodeB scheduler can comprise identities of scheduled UEs, identities of resource blocks that said UEs are scheduled on, identities of sub-frames that UEs are scheduled on, modulation assignment for said UEs and channel coding assignment for said UEs. Consequently, in some embodiments, term performing UE scheduling decisions comprises deciding on the identities of scheduled UEs, identities of resource blocks that said UEs are scheduled on, identities of sub-frames that UEs are scheduled on, modulation assignment for said UEs and channel coding assignment for said UEs, and possible other decisions. In some embodiments, scheduling decisions are processed to compute the value of the FDM band-specific parameter. In some embodiments, this processing can include identification if a scheduled UE belongs to a pre-defined set (or class) of UE, such as a cell-edge UE, which can create high interference to adjacent cells. In some embodiments, elements of scheduling decisions can simply be transmitted to the second NodeB without any specific processing. Some embodiments of the invention require identifying a group of FDM bands for which the computed band-specific cell parameter value belongs to a pre-determined set of values. This can be performed by comparing each computed value of the FDM band-specific parameter against a pre-defined set of values. If the computed value belongs to the said pre-defined set of values, the particular FDM band belongs to the group. A simple example is threshold-ing of FDM band-specific parameters (for example interference estimates), where a group of FDM bands comprises those FDM bands where parameter (e.g. interference estimate) exceeds the threshold. Furthermore, note that, in some embodiments, the threshold can be specific to each FDM band (i.e. each FDM band can have a different threshold). Some embodiments of the invention mention transmit power adjustments. In some embodiments, a transmit power adjustment is a differential correction with respect to previous transmit power, such as an increase or reduction by x dB. In other embodiments, a transmit power adjustment can be a complete re-configuration of transmit power settings.

What is claimed:

1. A method for operating a cellular network, where said cellular network uses a plurality of frequency division multiplexing (FDM) bands for wireless communication from at least one user equipment (UE) to at least one base station (NodeB), comprising:
computing at least one band-specific cell parameter for at least one FDM band of the plurality of FDM bands;
transmitting said band-specific cell parameter from a first NodeB serving a first cell to a second NodeB serving a second cell; and
wherein said cellular network uses a first FDM band for multiplexing physical uplink shared channel (PUSCH) UEs and a second FDM band for multiplexing physical uplink control channel (PUCCH) UEs.

2. Method of claim 1, further comprising:
identifying a group of FDM bands for which the computed band-specific cell parameter value belongs to a pre-determined set of values; and
wherein transmitting said band-specific cell parameter comprises transmitting information reflective of the identified group of FDM bands.

3. The method of claim 1, wherein first NodeB and second NodeB are the same.

4. The method of claim 1, wherein computing a band-specific cell parameter for a first FDM band comprises:
performing UE scheduling decisions at the first NodeB for the first cell; and
processing said UE scheduling decisions at the first NodeB to compute the value for the band-specific cell parameter.

5. The method of claim 4, wherein said band-specific cell parameter for the first FDM band is selected from a group consisting of: identities of UEs scheduled on the first FDM band, indicators if UEs scheduled on first FDM band belong to a class of high-interference UEs, number of UEs scheduled on first FDM band, power configurations of UEs scheduled on first FDM band, modulation of UEs scheduled on first FDM band, channel coding information for UEs scheduled on first FDM band, and schedule duration for UEs scheduled on first FDM band.

6. The method of claim 1, wherein computing band-specific cell parameter for a first FDM band comprises:
performing band-specific measurements for at least the first FDM band at the first NodeB for the first cell; and
processing said band-specific measurements at the first NodeB to compute a value for said band-specific cell parameter.

7. The method of claim 6, wherein said band-specific measurement is made using received samples from at least the first FDM band, and wherein said band-specific measurement is selected from a group consisting of: interference power measurement, thermal noise power measurement, received signal power measurement, signal-to-interference-power-ratio (SIR) measurement, signal-to-interference-and-thermal-noise-power (SINR) measurement, rise-over thermal (RoT) measurement, throughput measurement, and cell-edge throughput measurement.

8. The method of claim 7, wherein said band-specific measurement is quantized to produce said band-specific cell parameter.

9. The method of claim 7, wherein transmission occurs whenever said band-specific parameter value belongs to a pre-determined set of values.

10. The method of claim 1, where said first FDM band comprises a plurality of FDM bands.

11. The method of claim 1, wherein each said FDM band is an integral multiple of 180 kHz.

12. The method of claim 1, wherein said wireless communication between UEs and NodeBs comprises a DFT precoder operation.

13. The method of claim 1, further comprising:
receiving another band-specific cell parameter from said second NodeB; and
adjusting use of at least said one FDM band from the plurality of FDM bands, in response to said received band-specific cell parameter.

14. The method of claim 13, wherein adjusting use of at least one said FDM band comprises scheduling a UE transmission on the FDM band in the first cell to avoid interference from use of the first FDM band by a different UE in the second cell.

15. The method of claim 13, wherein adjusting use of at least said one FDM band comprises sending at least one band-specific power configuration message to a UE served by the first NodeB.

16. The method of claim 15, further comprising:
receiving at the UE a first power configuration message for a first FDM band;
receiving at the UE a second power configuration message for a second FDM band;
receiving at the UE a scheduling message indicative of a selection of an FDM band from a plurality of FDM bands that includes a first FDM band and a second FDM band;
transmitting by the UE on the first FDM band with the first power configuration if said scheduling message indicated a selection of a first FDM band; and
transmitting by the UE on the second FDM band with the second power configuration if said scheduling message indicated a selection of the second FDM band.

17. A base station (NodeB) apparatus for use in a cellular network, wherein said cellular network uses a plurality of frequency division multiplexing (FDM) bands for wireless communication from user equipment (UE) to the NodeB, comprising:
a processor connected to a memory circuit for holding instructions for execution by the processor, wherein the processor is operable to compute at least one band-specific cell parameter;
a transmitter controllably coupled to the processor, the transmitter having an output for coupling to an inter-NodeB backhaul network, the transmitter being operable to transmit the computed band-specific cell parameter via the inter-NodeB backhaul network; and
wherein said cellular network uses a first FDM band for multiplexing physical uplink shared channel (PUSCH) UEs and a second FDM band for multiplexing physical uplink control channel (PUCCH) UEs.

18. The NodeB of claim 17, further comprising:
a receiver coupled to a processor, the receiver having an input for coupling to the inter-NodeB backhaul network, wherein the receiver is operable to receive at least one band-specific cell parameter via the inter-NodeB backhaul network.

* * * * *